United States Patent [19]

Likavec et al.

[11] Patent Number: 5,866,628

[45] Date of Patent: Feb. 2, 1999

[54] ULTRAVIOLET AND ELECTRON BEAM RADIATION CURABLE FLUORESCENT PRINTING INK CONCENTRATES AND PRINTING INKS

[75] Inventors: Wayne R. Likavec, Cleveland; Curtis Ray Bradley, Sheffield Village, both of Ohio

[73] Assignee: Day-Glo Color Corp., Cleveland, Ohio

[21] Appl. No.: 705,637

[22] Filed: Aug. 30, 1996

[51] Int. Cl.$^6$ ................................ C08J 3/28; C09K 11/06
[52] U.S. Cl. .................... 522/135; 522/141; 522/142; 522/120; 522/121; 522/96; 522/107; 522/75; 252/301.35; 106/20 B; 106/20 R
[58] Field of Search ................................ 522/135, 75, 96, 522/107, 120, 121, 141, 142; 106/20 B, 20 R; 252/301.35

[56] References Cited

U.S. PATENT DOCUMENTS

| | | |
|---|---|---|
| 3,620,993 | 11/1971 | Takano et al. . |
| 3,666,810 | 5/1972 | Hoke . |
| 3,945,980 | 3/1976 | Tsubakimoto et al. . |
| 4,016,133 | 4/1977 | Hyosu et al. . |
| 4,379,039 | 4/1983 | Fujimoto et al. ................ 204/159.15 |
| 4,623,689 | 11/1986 | Shintani et al. . |
| 4,975,220 | 12/1990 | Streitel et al. . |
| 5,003,000 | 3/1991 | Bock et al. . |
| 5,094,777 | 3/1992 | DiPietro . |
| 5,131,916 | 7/1992 | Eichenauer et al. . |
| 5,215,679 | 6/1993 | Cramm et al. . |
| 5,236,621 | 8/1993 | DiPietro . |
| 5,264,153 | 11/1993 | De Krom . |
| 5,294,664 | 3/1994 | Morrison, Jr. et al. . |

FOREIGN PATENT DOCUMENTS

| | | |
|---|---|---|
| 0 130 789 | 1/1985 | European Pat. Off. . |
| 0 209 879 | 1/1987 | European Pat. Off. . |
| 0 344 379 | 12/1989 | European Pat. Off. . |
| 0 376 758 A3 | 7/1990 | European Pat. Off. . |
| 0 496 142 A2 | 7/1992 | European Pat. Off. . |
| 779348 | 6/1997 | European Pat. Off. . |
| 1 142 504 | 2/1969 | United Kingdom . |

*Primary Examiner*—Marion McCamish
*Assistant Examiner*—Cheryl Juska
*Attorney, Agent, or Firm*—Calfee Halter & Griswold LLP

[57] ABSTRACT

The present invention provides ultraviolet curable or electron beam curable fluorescent inks and ink concentrates, which cure upon exposure to ultraviolet or electron beam radiation. The synthesis of the fluorescent ink and ink concentrates does not involve the use of volatile organic solvents, so removal of solvents is not necessary during the manufacturing process. The fluorescent inks and ink concentrates display minimal, consistent color shift when cured. The cured fluorescent inks and ink concentrates are solvent resistant, particularly to methyl ethyl ketone, methanol, nonane, and sec butyl alcohol. The fluorescent ink and ink concentrate is comprised of: from about 20 to 90%, preferably from about 30 to 70%, more preferably from about 30 to 60% by weight of an oligomer, which is either a formaldehyde oligomer or a cyclic-aliphatic oligomer; from about 0.1 to 15%, preferably about 1 to 10%, of fluorescent dye; and from about 10 to 80%, preferably from about 30 to 70%, more preferably from about 35 to 60% of a photopolymerizable vehicle. The oligomer preferably has a weight average molecular weight of at least 400 g/mole. Preferably the oligomer has a molecular weight of from about 400 to 50,000 g/mole. The formaldehyde oligomer embodiment of the fluorescent ink preferably contains from about from 45% to 60% photopolymerizable vehicle, and from about 30 to 45%, oligomer. The formaldehyde oligomer contains from about 5% to 60%, preferably from about 15 to 45 % polymerized units of formaldehyde monomer and from about 40 to 95%, preferably about 55 to about 85%, polymerized units of an aromatic amide monomer. The cyclic-aliphatic oligomer embodiment preferably contains from about from 35% to 55% photopolymerizable vehicle, and from about 40 to 60%, oligomer. The cyclic-aliphatic oligomer contains polar groups and is comprised of polymerized units of from about 20 to 80%, preferably from about 30 to, 50% of cyclic monomers, and from about 80 to 20%, preferably from about 50 to about 70%, aliphatic monomers.

27 Claims, No Drawings

ULTRAVIOLET AND ELECTRON BEAM RADIATION CURABLE FLUORESCENT PRINTING INK CONCENTRATES AND PRINTING INKS

BACKGROUND OF THE INVENTION

The graphic arts industry has been evolving techniques of printing on a wide range of substrates. Many printing techniques involve one or a combination of "ink drying" techniques which utilize volatile organic compounds. As environmental awareness increases, there is an overall movement to reduce the emissions of volatile organic compounds.

The environmental pressure led to the development of inks which lack a volatile organic solvent on which are dried, or more appropriately cured, using either ultraviolet or electron beam radiation, thereby eliminating evaporation of volatile organic compounds. The customary ultraviolet and electron beam cured inks are not without flaw however. Many customary inks display poor color strength, weak fluorescence and fading. Indeed, the colored chromophores, especially fluorescent dyes, are susceptible to photodegradation when exposed to the ultraviolet radiation used in the curing process. The photodegradation results in a shift in the color of the chromophore and a loss in the color intensity.

Furthermore, many of the fluorescent colorants are either incompatible, or not dispersible within the photopolymerizable vehicle and therefore are not suitable for use in ultraviolet/electron beam cured inks. Thus the color selection of ultraviolet and electron beam curable fluorescent inks is limited.

Some ultraviolet curable inks have been developed which are capable of "wetting" conventional colored pigments and dyes into the photopolymerizable systems. However, the photopolymerizable wetting agents must first be synthesized, and the conventional pigment or dye then dispersed into the photopolymerizable system either through high shear, grinding, or milling operations. Also, many of these photopolymerizable wetting agents are synthesized using volatile organic solvents, which must be removed from the product. Furthermore, many of these photopolymerizable wetting agents render the ink suitable for only specific substrates and thus have limited applications.

It would be desirable to have fluorescent ink concentrates and fluorescent inks which are ultraviolet/electron beam curable, that do not contain nor require for synthesis volatile organic solvents, yet are solvent resistant when cured.

SUMMARY OF THE INVENTION

The present invention provides radiation curable, including ultraviolet curable or electron beam curable, fluorescent inks and ink concentrates, which cure upon exposure to ultraviolet or electron beam radiation. The synthesis of the fluorescent ink and ink concentrates does not involve the use of volatile organic solvents, so removal of solvents is not necessary during the manufacturing process. The fluorescent inks and ink concentrates display minimal, consistent color shift when cured. The cured fluorescent inks and ink concentrates are solvent resistant, particularly to methyl ethyl ketone, methanol, nonane, and sec butyl alcohol. The fluorescent ink and ink concentrate is comprised of: from about 10 to 90%, preferably from about 20 to 70%, more preferably from about 30 to 60% by weight of an oligomer, which is either a formaldehyde oligomer or a cyclic-aliphatic oligomer; from about 0.1 to 15%, preferably about 1 to 10%, of fluorescent dye; and from about 10 to 80%, preferably from about 30 to 70%, more preferably from about 35 to 60% of a photopolymerizable vehicle. The oligomer preferably has a weight average molecular weight of at least 400 g/mole. Preferably the oligomer has a molecular weight of from about 400 to 50,000 g/mole. The formaldehyde oligomer embodiment of the fluorescent ink preferably contains from about from 45% to 60% photopolymerizable vehicle, and from about 30 to 45%, oligomer. The formaldehyde oligomer contains from about 5% to 60%, preferably from about 15 to 45% polymerized units of formaldehyde monomer and from about 40 to 95%, preferably about 55 to about 85%, polymerized units of an aromatic amide monomer. The cyclic-aliphatic oligomer embodiment preferably contains from about from 35% to 55% photopolymerizable vehicle, and from about 40 to 60%, oligomer. The cyclic-aliphatic oligomer contains polar groups and is comprised of polymerized units of from about 20 to 80%, preferably from about 30 to 50%, of cyclic monomers, and from about to 80 to 20%, preferably from about 50 to about 70%, aliphatic monomers.

The invention also relates to printing methods employing the fluorescent inks and ink concentrates.

DETAILED DESCRIPTION OF THE INVENTION

The present invention provides a radiation curable fluorescent ink concentrate and fluorescent ink that are suitable for printing on paper, plastic, and metal substrates via flexographic, lithographic, gravure and screen ink printing techniques. Radiation includes that radiation which induces chemical change, that is, curing; for example, actinic radiation such as ultraviolet radiation, and electron beams.

The synthesis of the fluorescent ink concentrate does not involve the use of volatile organic solvents, so removal and disposal of organic solvents are avoided.

The fluorescent ink concentrate and the fluorescent ink, are comprised of: from about 10 to 90%, preferably from about 20 to 70%, more preferably from about 30 to 60% by ink weight of an oligomer, which is either a formaldehyde oligomer or a cyclic-aliphatic oligomer; from about 0.1 to 15%, preferably about 1 to 10%, of fluorescent dye; and from about 10 to 80%, preferably from about 30 to 70%, more preferably from about 35 to 60% of a photopolymerizable vehicle. Unless otherwise noted, the percents stated herein are by weight. The oligomer preferably has a weight average molecular weight of at least 400 g/mole. Preferably the oligomer has a molecular weight of from about 400 to 50,000 g/mole. The formaldehyde oligomer embodiment of the fluorescent ink preferably contains from about from 45% to 60% photopolymerizable vehicle, and from about 30 to 45%, oligomer. The formaldehyde oligomer contains from about 5% to 60%, preferably from about 15 to 45% polymerized units of formaldehyde monomer and from about 40 to 95%, preferably about 55 to about 85%, polymerized units of an aromatic amide monomer. The cyclic-aliphatic oligomer embodiment preferably contains from about 35% to 55% photopolymerizable vehicle, and from about 40 to 60%, oligomer. The cyclic-aliphatic oligomer contains polar groups and is comprised of polymerized units of from about 20 to 80%, preferably from about 30 to 50%, of cyclic monomers, and from about 80 to 20%, preferably from about 50 to about 70%, aliphatic monomers.

The photopolymerizable vehicle is comprised of at least one acrylated or methacrylated monomer, or at least one acrylated or methacrylated oligomer or a mixture thereof.

The fluorescent ink concentrates and fluorescent inks, display minimal, consistent color shift when cured. The fluorescent ink concentrates and fluorescent inks also transfer to numerous substrates and result in cured films that are solvent resistant, particularly to methyl ethyl ketone.

The fluorescent ink concentrates and fluorescent inks when cured, provide a cured matrix comprise of a cross-linked polymer.

The Oligomer

The oligomer preferably contains polyamide or polyester amide or polyester linkages. The oligomer is either a formaldehyde oligomer, or a cyclic-aliphatic oligomer, which preferably lacks formaldehyde. The oligomer solublizes the fluorescent dyes, develops the color of the dye in the cured film, and protects the dye from photodegradation during exposure to the ultraviolet or electron beam radiation.

The Formaldehyde Oligomer Embodiment

The formaldehyde oligomer is comprised of amide linkages and optionally, esters, and comprises polymerized units of formaldehyde monomers, and polymerized units of aromatic amide monomers, preferably aromatic sulfonamide. The aromatic amide monomers, have from 6 to 20 carbon atoms, preferably from 6 to 12 carbon atoms, at least one amide group and at least one, preferably two, amide hydrogen atoms. As used herein "amide" also includes sulfonamides. Where only one amide group with one amide hydrogen is present on the aromatic amide monomer, then at least one functional group is present which reacts with the formaldehyde monomer to form the oligomer. Such other functional group includes, for example, alcohol groups, or a carboxylic acid group.

Suitable amide monomers include for example toluenesulfonamide, benzamide, benzenesulfonamide, and alkyl derivatives of these reactants.

Optionally, the formaldehyde oligomer contains polymerized units of a crosslinking monomer having from about 1 to 28, preferably from about 3 to 12, carbon atoms and which contains at least two amino groups and at least three amino hydrogen atoms, which react with formaldehyde. Melamine is the preferred crosslinking monomer. Other suitable crosslinking monomers include, for example, urea, isophorone diamine, ethylene diamine, hexamethylene diamine, 2-methylpentamethylenediamine, benzogaunamine, p,p'diaminodiphenylmethane, 3,5-diaminobenzoic acid, guanidine, 2,4-diamino-b-hydroxypyrimidone, and aminoguanidine.

As used herein the term "formaldehyde monomer" encompasses not only formaldehyde, but also paraformaldehyde, which is a polymerized form of formaldehyde; and formalin. When the crosslinking monomer is employed, the ratio of the formaldehyde monomer to the aromatic amide monomer to the crosslinking monomer is from about 100:200:1 to 5:3:2, preferably about 13:6:2. When the cross linker is not employed, the formaldehyde: aromatic amide ratio is from about 1:1 to 1:2. If go beyond such ratios, typically the fluorescent ink concentrate will contain unreacted material which crystallizes.

In a preferred formaldehyde oligomer comprising formaldehyde, toluenesulfonamide and melamine, the ratio is from 1:2:0 to 10:3:2. The molecular weight of the formaldehyde oligomer is from about 400 to 5000 g/mole, preferably about 800 to 1300 g/mole.

A preferred formaldehyde fluorescent ink concentrate comprises from about 30 to 45% of the formaldehyde oligomer which comprises: from about 20 to 28% of formaldehyde; from about 48 to 70% of the aromatic amide toluene sulfonamide, and from about 10 to 24% of melamine crosslinking monomer; and the ink comprises from about 5 to 7% dye, and from about 45 to 60% of the photopolymerizable vehicle; the photopolymerizable vehicle is comprised of tripropyleneglycol diacrylate and trimethylolpropane ethoxylated triacrylate.

The formaldehyde based oligomer optionally contains polymerized units of isocyanate monomers or hydroxy acrylate monomers or both. Suitable isocyanate monomers include, for example, toluene diisocyanate, diphenylmethane diisocyante and paratoluenesulfonyl isocyanate. Suitable hydroxy acrylate monomers include both acrylated and methacrylated alcohols such as, for example hydroxypropyl acrylate, hydroxypropyl methacrylate, hydroxyethyl acrylate, and hydroxyethyl methacrylate.

Optionally amides or alcohol or amino alcohol monomers having a functionality from 1 to 6, most preferably from 1 to 3, are added.

The Cyclic-aliphatic Oligomer Embodiment

The cyclic-aliphatic oligomer has a molecular weight of about 1000 to 50,000, preferably 1,500 to 20,000, most preferably about 2,500 to 15,000. The cyclic-aliphatic oligomer is non-ionic, less polar than water, and preferably more polar than dodecane. The cyclic-aliphatic oligomer is comprised of: polymerized units of aromatic or non-aromatic cyclic monomers, and aliphatic monomers. The cyclic monomers have at least 5 carbon atoms, preferably 5 to 7 carbon atoms in the ring; the ring is substituted or unsubstituted and the cyclic monomer contains from 5 to 15, preferably from 6 to 9 carbon atoms in total. The aliphatic monomer is saturated or unsaturated having from 0 to 6 , preferably 1 to 6, more preferably 0 to 3, most preferably 1 to 3 double bonds.

Preferably, the cyclic-aliphatic oligomer is formed from polymerized units of from about 20 to 80%, more preferably about 30 to 70%, most preferably from about 40 to 55% of cyclic monomers, and, from about 20 to 80%, preferably from about 30 to 70, more preferably from about 30 to 50%, most preferably from about 45 to 60% aliphatic monomers.

Suitable cyclic monomers include, for example, p,p-diaminodiphenylmethane, cyclohexane dimethanol, phthalic anhydride, isophorone diamine, bisphenol A, benzoic acid, chlorendenic anhydride pyromellitic anhydride, tris (2-hydroxyethyl) isocyanurate and trimellitic anhydride.

The aliphatic monomers have fatty, linear or branched aliphatic segments preferably having from 2 to 80, more preferably 4 to 40, most preferably from 6 to 20 carbon atoms, and which contain at least one functional group, preferably from 1 to 6, more preferably from 1 to 3, groups for polymerization with the other monomers; such functional group is preferably selected from alcohol groups, amine groups, carboxylic acid groups and anhydride or acid chlorides thereof or mixtures thereof. The aliphatic monomers render the cyclic-aliphatic oligomer compatible with the photopolymerizable vehicle. Optionally the aliphatic monomer is also photopolymerizable. Suitable aliphatic monomers include for example, cetyl alcohol, 1,6-hexanediol, 1,6-hexanediamine, azealaic acid, lauryl alcohol, myristryl alcohol, docosyl alcohol, oleyl alcohol, cetyl alcohol, stearyl alcohol, oleic acid, linoleic acid, maleic acid, maleic anhydride succinic acid, methacrylic acid, ethylene diamine, ethylene glycol, stearic acid, aliphatic acid esters and their acid chloride derivatives, and butanol, pentaerythritol, polyethleneglycol, hydroxy ethyl methacrylate, dipentaerythritol pentaacrylate and polytetramethylene oxide.

Optionally, resins to impart fire retardance are added. Suitable additives include, for example, tetrabromobisphenol A epoxy resins having a weight per epoxy of about 400, commercially available as Epon 1163 resin from Shell Chemical Company, and chlorinated epoxy resins having about 45% chlorine by mass, commercially available under the designation RLEO54 from Shell Chemical Company.

Preferably there is at least 1 polar group on each cyclic aliphatic oligomer. More preferably there is at least about 10 times the number of polar groups as are the number of dye molecules present in the fluorescent ink. Preferably polar groups are present on the cyclic monomer or the aliphatic monomer or both. Alternatively, a third monomer, a polar monomer, having polar groups is employed to provide the cyclic-aliphatic oligomer with polar groups.

The cyclic-aliphatic oligomer preferably has a maximum melt point of about 50° C. or lower, more preferably about 20° C. or lower, most preferably about 10° C. or lower. The cyclic-aliphatic monomer preferably lacks formaldehyde monomer. The cyclic-aliphatic oligomer is a polyester, polyester-amide, polyurethane, polyurea, or polyurethane-urea. The cyclic-aliphatic oligomer has a solubility of at least 0.2 grams per 1 gram of photopolymerizable vehicle.

The Photopolymerizable Vehicle

The photopolymerizable vehicle acts as a binder for the oligomer, forms a hard, solvent resistant resin when cured and promotes adhesion of the fluorescent ink concentrates and fluorescent inks to the substrate. The photopolymerizable vehicle is comprised of: an acrylated or methacrylated photopolymerizable monomer; or acrylated or methacrylated photopolymerizable oligomers; or both. The photopolymerizable vehicle has at least one unsaturated bond. The photopolymerizable monomers preferably have an unsaturated functionality from 1 to 5, most preferably 2 to 5, and a molecular weight preferably from about 50 to 1,000, more preferably from about 100 to 600. The viscosity of photopolymerizable monomers is from about 50 to 20,000, preferably from 50 to 1,500 centipoise, at 20° C., Suitable photopolymerizable monomers include, for example: 1,6-hexanediol diacrylate, tripropyleneglycol diacrylate, trimethylolpropane triacrylate, pentaerythritol triacrylate, dipentaerythritol pentaacrylate, trimethylolopropane ethoxylated triacrylate, allyl methacrylate, laurel acrylate, octyl acrylate, tris (2-hydroxy ethyl) isocyanurate triacrylate, and trimethylolpropane trimethacrylate. The photopolymerizable monomers enhance the curing of the fluorescent ink and act as a diluent.

The photopolymerizable oligomers have an unsaturated functionality from 1 to 6, more preferably from 2 to 5, a molecular weight from 400 to 10,000 preferably from 500 to 2000 grams per mole, and viscosity from 100 to 500,000 cps, more preferably from 1000 to 40,000 cps. Suitable photopolymerizable oligomers include, for example, a fatty acid modified epoxy acrylate available as EBECRYL 3608, from UCB Radicure, bisphenol A epoxy diacrylate, bisphenol A epoxy dimethacrylate, aliphatic urethane triacrylate, aromatic urethane hexaacrylate, multifunctional polyester acrylates, acid modified multifunctional polyester acrylates etc. The photopolymerizable oligomer provide good cure but are viscous and do not act as a diluent.

Acrylated oligomers, for example, acrylated epoxy and urethane photopolymerizable oligomers provide the fluorescent ink with enhanced adhesion to plastic substrates. Suitable photopolymerizable oligomers are commercially available as Ebecryl 264, Ebecryl 230, Ebecryl 284, Ebecryl 8402 and Ebecryl 860 from UCB Chemicals. Acrylated oligomers, such as polyester and polyureas tend to promote adhesion and transfer to metal substrates. Suitable photopolymerizable oligomers are commercially available as Ebecryl 3605, Ebecryl 616 and Ebecryl 438. Metallic diacrylates such as those available as SR-9016 and SR-9017 from Sartomer Chemical increase the adhesion of the fluorescent ink to aluminum.

Acrylated photopolymerizable oligomers, such as acrylated urethanes oligomers, promote adhesion and transfer of the fluorescent ink to cellulose based substrates particularly to wood and paper. Suitable photopolymerizable oligomers are commercially available as Ebecryl 600, Ebecryl 605, Ebecyrl 3200, Ebecryl 3720 and Ebecryl 4849, and Ebecryl 40, from UCB Chemicals.

Fluorescent Dye

The fluorescent dyes used in the fluorescent inks are conventional fluorescent organic, which are brilliantly fluorescent when in solution. These fluorescent type dyes belong to the dye families known as rhodamines, fluoresciens, coumarins, napthalimides, benzoxanthenes, acridines, and azos. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160 and Fluorescent Brightner 61. The fluorescent dyes comprise from 0.1 to 15% of the total weight of the concentrate. One or more fluorescent dyes are present in the fluorescent concentrate. Optionally, conventional non-fluorescent dyes and pigments are added in conjunction with fluorescent dyes to provide particular shades of fluorescent ink concentrates and fluorescent inks. For example, blue and green shades are made by combination of the fluorescent dyes with conventional pigment dispersions which contain Pigment Blue 15:3 or Pigment Green 7. Suitable conventional dyes and pigments include, for example, Pigment Yellow 1, Pigment Yellow 3, Pigment Red 48:4, Solvent Blue 38, Solvent Blue 78, Solvent Yellow 33, Solvent Red 24, Solvent Red 52, and Solvent Violet 36.

The Photoinitiator

The photoinitiator is not needed to provide fluorescent ink concentrates and fluorescent inks which are curable with electron beam radiation, however, a photoinitiator is necessary to provide fluorescent ink concentrates and fluorescent inks which are curable with ultraviolet light. The photoinitiator is present from about 0% to about 20%, preferably about 0.1% to about 20%, more preferably about 7 to 15% of the fluorescent ink concentrates and fluorescent inks. The photoinitiator is preferably liquid at room temperature. Suitable photoinitiators include, for example, 2-hydroxy-2-methyl-1-phenyl-1-propanone available as Daracure 1173, from Ciba Geigy, benzophenone; Esacure TZT, a mixture of 2,4,6-trimethyl benzophenone and 4-methyl benzophenone, available as Esacure TZT; 2,2-dimethoxy-1,2-diphenyl ethanone, available as Esacure KB1; a mix of 2-butoxy-1, 2-diphenyl ethanone and 2-(2methlypropoxy)-1,2-diphenylethenone available as Esacure EB3; a mixture of Esacure TZT and 2-isopropylthioxanthone available as Esacure X 15. The Esacure photoinitiators are available from Sartomer. Benzophenone when employed as a photoinitiator, is preferably mixed with 2-hydroxy-2-methyl-1-phenyl-1-propanone.

Optional Ingredients

Optional additives include, for example, hydroquinone, hydroquinone monomethylether, hindered amine light stabilizers, antioxidants, polyethylene wax, polytetrafluoroethylene wax, ultraviolet absorbers, silicone, fumed silica, acrylic binder, alkyd binder, talc and micro-talc. The optional ingredients are preferably present from 0 to 15%, more preferably 1 to 15%, most preferably 1–10%.

Optionally, a catalyst is employed to catalyze the esterification of the oligomer. A suitable catalyst is available under the tradename Fastcat 2001 from ATOCHEM.

Optionally, photosynergists are employed as coinitiators in conjunction with acyl ketone photoinitiators such as for example benzophenone. Suitable photosynergists include, for example, N-methyl-diethanol amine, triethanolamine 2-(butoxy)ethyl-4-dimethyaminobenzoate and reactive amine acrylates commercially available as Ebecryl P104, Ebecryl P105, and Ebecryl 7100 from UCB Radicure Chemicals Corporation.

Optionally pH control agents are used to control pH of the polymerization, preferably to between about 4 and 10. Good results have been obtained using potassium tetraborate as a base and phosphorous acid.

Preparing the Fluorescent Ink Concentrate

The fluorescent ink concentrate is prepared by combining a formed oligomer with the fluorescent dye and photopolymerizable vehicle. Alternatively, the monomers used to form the oligomer are added along with the dye and photopolymerizable vehicle to form the fluorescent ink concentrates and fluorescent inks.

During the oligomerization reaction, the starting materials are reacted within a temperature range of 20°–300° C., most preferably in a range from 60°–190° C. Once the reactants are dissolved and the media is homogenous, typically about 20 to 120 minutes, the dyes and any optional ingredients are added to the molten oligomer in order to dissolve, disperse, or react all of the components. Once the molten system is homogenous, the reaction is cooled preferably to between 60° and 130° C. The photopolymerizable vehicle is then quickly added under mechanical mixing to provide a homogenous mixture. Preferably, the homogeneous mixture is then heated to 110° C. in order to remove residual water to provide an ultraviolet/electron beam curable fluorescent ink concentrate which is a homogeneous mixture of the dye, dye carrying oligomer and photopolymerizable vehicle. The Fluorescent ink concentrate is preferably further diluted, preferably with the photopolymerizable vehicle to provide printing fluorescent ink of the desired viscosity.

The fluorescent ink concentrates and fluorescent inks are applied using conventional techniques and then subject to a curing stage. The cure is accomplished using ultraviolet radiation or electron beam radiation, using conventional ultraviolet or electron beam sources. Good results have been obtained using a mercury lamp from American UV, at settings of 125, 225, or 300 watts/inch at wavelengths of 100 to 450 nm. Good results have been obtained placing samples on a conveyor belt at speeds of 50, 100, 150 and 200 feet/minute to provide exposure to the ultraviolet lamp for times of 0.35, 0.175, 0.117 and 0.0875 seconds.

Where the fluorescent ink is electron beam cured, the samples are exposed to electron beams using a conventional electron beam generator such as those available from Energy Sciences Incorporated. Good results have been obtained using dosages of 1 to 2 Mrad, 200 to 1000 ppm $O_2$, and 125 to 150 KeV.

The cure process involves the generation of free radicals, either by photodisassociation of the initiator upon exposure to ultraviolet or electron beam radiation, or through the generation of free radicals, radical cations, radical anions, and other unstable intermediates from the photopolymerizable monomer system during exposure to electron beam radiation. These unstable intermediates then induce the photopolymerizable carrier to solidify via chain polymerization.

The fluorescent ink concentrate is typically about 10,000 to 250,000 centipoise, preferably about 30,000 to 150,000 centipoise. The fluorescent ink concentrate made according to the methods described herein, while useable as an ink is typically diluted with photopolymerizable vehicle for printing.

EXAMPLES

The following examples are for illustrative purposes and are not intended to limit the scope of the invention. The following fluorescent inks are electron beam curable; those fluorescent ink concentrates and fluorescent inks to which a photoinitiator has been added are also curable with ultraviolet light.

Example 1

A fluorescent ink concentrate was synthesized by combining 92.5 grams of chlorendic anhydride with 65.0 grams of hydroxyethyl methacrylate in a reaction vessel. The reaction was heated to 100° C. and 4.0 grams of Basic Violet 11 and 8.0 grams of Basic Red 1 were added. The reaction was then heated to 130° C. and then cooled to ambient temperature. Then trimethylolpropane triacrylate and a Darocure 1173 photoinitiator were added in a 3.5:5.5:1 ratio respectively, then heated to 100° C. until homogenous, to provide an ultraviolet curable fluorescent ink.

Example 2

A fluorescent ink concentrate was synthesized by combining 34 grams of RLE054, a chlorinated epoxy resin from Shell Chemical Company with 32.5 grams of hydroxyethyl methacrylate and 15 grams of ethoxylated trimethylolpropane triacrylate. The reaction was heated to 100° C. and 3.3 grams of Basic Violet 11, and 6.7 grams of Basic Red 1 were added. Then 42.5 grams of isophorone diamine was added to the reaction, heated to 130° C. and cooled to ambient temperatures, to provide a fluorescent pink fluorescent ink concentrate.

Example 2A

The fluorescent ink concentrate of Example 2 was combined with trimethylolpropane triacrylate and Darocure 1173 photoinitiator in a 3.5:5.5:1 ratio respectively to form an ultraviolet curable fluorescent ink.

Example 3

A fluorescent ink concentrate was synthesized by combining 100 grams of EPON resin 1163 with 32.5 grams of hydroxyethyl methacrylate and 37 grams of chlorendic anhydride. The reaction was heated to 100° C. and 3.3 grams of Basic Violet 11, and 6.7 grams of Basic Red 1 were added. The mixture was heated to 130° C. and allowed to cool to ambient temperature, to provide a fluorescent pink fluorescent ink concentrate.

Example 3A

The fluorescent ink concentrate of Example 3 was combined with trimethylolpropane triacrylate and Darocure 1173 photoinitiator in a 3.5:5.5:1 ratio respectively to form an ultraviolet curable fluorescent ink.

Example 4

A fluorescent ink concentrate was synthesized by combining 52 grams of dipentaerythritol pentaacrylate with 37 grams of chlorendic anhydride. The reaction was dyed at 100° C. then 9.0 grams of Basic Red 1 and 4.5 grams of Basic Violet 11 were added and then heated to 130° C. The reaction was then cooled to ambient temperature. Then trimethylolpropane triacrylate and Darocure 1173 photoinitiator were added in a 3.5:5.5:1 ratio respectively to form an ultraviolet curable fluorescent ink.

Example 5

A fluorescent ink concentrate was synthesized by combining 38 grams of water with 0.45 grams of potassium tetraborate, 40.44 grams of formaldehyde, and 104.9 grams of toluenesulfonamide. The reaction was heated to 100° C. During the heating process, 26.8 grams of Solvent Yellow 85, 3.98 grams of Basic Red 1, and 0.7 grams of Basic Violet 11 was added and 26.76 grams of melamine was added at 85° C. The reaction was held at 100° C. for 5 minutes upon which a solution of 250 grams of trimethylolpropane triacrylate with 0.4 grams of hydroquinone was added to the reaction. The mix was reheated to 110° C. and milled on a three roll mill at room temperature, to provide fluorescent orange ink concentrate.

Example 5A

The fluorescent ink concentrate of Example 5 was combined with 7.0 grams of the concentrate of Example 5 to 1.0 grams of Ebecryl 3608, a fatty acid modified epoxy acrylate, and 0.3 grams of trimethylolpropane triacrylate, to provide an fluorescent ink.

Example 6

A fluorescent ink concentrate was synthesized as in Example 5 using 27.6 grams of Solvent Yellow 85, 3.73 grams of Basic Red 1, and 0.66 grams of Basic Violet 11, and 56 grams of benzoguanamine instead of melamine. After the addition of 300 grams of trimethylolpropane triacrylate, 0.4 grams of phosphorous acid, 11.5 grams of micro talc, and 7.2 grams of Aerosil 972, an amorphous fumed silica, were added to the reaction.

Example 7

A fluorescent ink concentrate was synthesized as in Example 5 using 13.0 grams of melamine, 7.0 grams of urea, and 300 grams of trimethylolpropane triacrylate instead of 26.7 g melamine and 250 g. trimethylolpropane triacrylate. After addition of the trimethylolpropane triacrylate, 0.4 grams of phosphorous acid and 11.5 grams of micro talc were added.

Example 8

A fluorescent ink concentrate was synthesized by combining 38 grams of water with 0.45 grams of potassium tetraborate, 32.0 grams of formaldehyde, and 185.2 grams of toluenesulfonamide. The reaction was heated to 100° C. During the heating process, 25 grams of Solvent Yellow 85, 3.38 grams of Basic Red 1, and 0.6 grams of Basic Violet 11 were added to the reaction after the toluenesulfonamide melted. The reaction was held at 100° C. for 5 minutes upon which a solution containing 300 grams of trimethylolpropane triacrylate with 0.24 grams of hydroquinone, 0.4 grams of phosphorous acid and 11.5 grams of micro-talc was added to the reaction. The mixture was reheated to 110° C., maintained for ten minutes, then milled on a three roll mill at room temperature, to provide a fluorescent orange ink concentrate.

Example 8A

An ultraviolet curable fluorescent ink was prepared by adding 7.0 grams of the ink concentrate of Example 8 to 1.0 grams of Ebecryl 3608, fatty acid modified epoxy acrylate, 0.7 grams of Darocure 1173 photoinitiator and 0.3 grams of trimethylolpropane triacrylate.

Example 9

A fluorescent ink concentrate was synthesized as in Example 8, except that 42.5 grams rather than 71.91 grams of formaldehyde was used, 213.75 grams rather than 182.2 grams of toluenesulfonamide was used and, 10 grams of melamine, and 7.2 grams of Aerosil 972, an amorphous fumed silica, were added.

Example 10

A fluorescent ink concentrate was synthesized by combining 38 grams of water with 0.45 grams of potassium tetraborate, 60.66 grams of formaldehyde, and 157.3 grams of toluenesulfonamide. The reaction was heated to 100° C. During the heating process, 25 grams of Solvent Yellow 85, 3.38 grams of Basic Red 1, and 0.6 grams of Basic Violet 11 were added to the reaction after the toluenesulfonamide melted, then 84 grams of benzoguanimine was added at 85° C. The reaction was held at 100° C. for 5 minutes upon which 300 grams of trimethylolpropane triacrylate was added to the reaction. The mix was reheated to 110° C. and milled on a three roll mill at room temperature, to provide a fluorescent orange ink concentrate.

Example 10A

An ultraviolet curable fluorescent ink was prepared by combining 7.0 grams of the fluorescent ink concentrate of Example 10 with 1.0 grams of Ebecryl 3608, a fatty acid modified epoxy acrylate, 0.7 grams of Darocure 1173 photoinitiator and 0.3 grams of trimethylolpropane triacrylate.

Example 11

A fluorescent ink concentrate was synthesized as in Example 10, except 0.4 grams of phosphorous acid was added after the trimethylolpropane triacrylate addition.

Example 12

A fluorescent ink concentrate was synthesized by reacting 98 grams of cetyl alcohol with 56 grams of phthalic anhydride at 190° C. for two hours. The reaction was then cooled to 150° C. upon which 14.3 grams of Basic Yellow 40, 2.1 grams of Basic Red 1, and 0.6 grams of Basic Violet 11 was added to the reaction. Once the dyes were dissolved, the reaction was cooled to 100° C. upon which 250 grams of tripropylene Glycol diacrylate was added to the reaction, to provide a fluorescent orange ink concentrate.

Example 12A

An ultraviolet curable fluorescent ink was prepared by adding 8 grams of the fluorescent ink concentrate of Example 13 to 1.0 grams of Ebecryl 3608, a fatty acid modified epoxy acrylate and 1.0 grams of Darocure 1173 photoinitiator.

Example 13

A fluorescent ink concentrate was synthesized by reacting 0.45 grams of potassium tetraborate with 40.44 grams of formaldehyde, with 104.9 grams of toluenesulfonamide in 37.5 grams of water. The reaction was heated to 85° C. upon which 8.0 grams of Solvent Yellow 135, 26.76 grams of melamine, and 0.24 grams of hydroquinone was added to the reaction. The reaction was heated to 100° C. upon which 300 grams of a 40/60 solution of Ebecryl 3608 in trimethylolpropane triacrylate was added to the reaction. The mix was heated to 110° C. and cooled to ambient temperatures, to provide a fluorescent yellow ink concentrate.

Example 14

74.60 grams of the fluorescent ink concentrate of Example 13 was added to 5.4 grams of Raysperse EG7 from Willow Inc., to provide a fluorescent green electron beam curable fluorescent ink concentrate.

Example 14A

The fluorescent ink concentrate of Example 14 was combined with 13 grams of trimethylolpropane triacrylate and 7.0 grams of Darocure 1173 photoinitiator to form an ultraviolet curable fluorescent ink.

Example 15

A fluorescent ink concentrate was synthesized by combining 38 grams of water with 56 grams of urea, 152 grams of toluenesulfonamide, 72 grams of formaldehyde, 40 grams of n-butanol, 27.6 grams of Solvent Yellow 85, 3.38 grams of Basic Red 1, 0.6 grams of Basic Violet 11, and 0.45 grams of potassium tetraborate. The reaction was heated to 100° C. upon which 250 grams of trimethylolpropane ethoxylated triacrylate and 0.45 grams of phosphorous acid was added to the reaction. The reaction was then heated to 110° C., held for 15 minutes, and then cooled to ambient temperature, to provide a fluorescent orange ink concentrate.

Example 15A

An ultraviolet curable fluorescent ink was prepared by adding 8.0 grams of the fluorescent ink concentrate of Example 15 to 1.0 grams of trimethylolpropane triacrylate, and 1.0 gram of Darocure 1173 photoinitiator.

Example 16

A fluorescent ink concentrate was synthesized by combining 56 grams of water with 60.66 grams of formaldehyde, 157.35 grams of toluenesulfonamide and 0.67 grams of potassium tetraborate. The reaction was heated to 100° C. with the addition of 37.5 grams of Solvent Yellow 85, 0.90 grams of Basic Violet 11, 5.07 grams of Basic Red 1 and 40.14 grams of melamine during the heating process. The reaction was held at 100° C. for several minutes, upon which a solution of 187.5 grams of tripropyleneglycol diacrylate, 187.5 grams of trimethylolpropane ethoxylated triacrylate, 0.36 grams of hydroquinone and 17.25 grams of talc was added to the reaction. The reaction was heated to 110° C. and then cooled to ambient temperature, to provide a fluorescent orange concentrate ink.

Example 16A

A fluorescent ink was prepared by combining 8.0 grams of the fluorescent ink concentrate of Example 16 with 1.0 gram of Ebecryl 3608, a fatty acid modified epoxy acrylate, and 1.0 grams of trimethylolpropane ethoxylated triacrylate.

Example 17

A fluorescent ink concentrate was synthesized by reacting 100 grams of maleic anhydride with 72 grams of 1,4-cyclohexanedimethanol, 59 grams of 1,6-hexanediol and 0.2 grams of Fastcat 2001 catalyst. The reaction was held at 190° C. for one hour and then 15 grams of Basic Yellow 40, 0.5 grams of Basic Violet 11, and 2.1 grams of Basic Red 1, were added. The reaction was cooled to 120° C. upon which 200 grams of tripropyleneglycol diacrylate was added to the reaction to provide a fluorescent orange ink concentrate.

Example 17A

An fluorescent ink was made by adding 8.0 grams of the fluorescent ink concentrate of Example 17 to 2.0 grams of Ebecryl 3608, a fatty acid modified epoxy acrylate, and 1.0 gram of Darocure 1173 photoinitiator.

Example 18

A fluorescent ink concentrate was synthesized as in Example 17 by eliminating the 1,6-hexanediol, and using 160 grams, instead of 72 grams, of 1,4-cyclohexanedimethanol.

Example 19

A fluorescent ink concentrate was synthesized by reacting 120 grams of succinic acid with 120 grams of 1,4-cyclohexanedimethanol, 29 grams of 2-methyl-1,5-diaminopentane and 0.2 grams of Fastcat 2001 catalyst. The reaction was held at 195° C. for one hour and then 15 grams of Basic Yellow 40, 0.6 grams of Basic Violet 11, and 3.8 grams of Basic Red 1, were added. The reaction was cooled to 120° C. then 200 grams of tripropyleneglycol diacrylate was added to the reaction, to provide a fluorescent orange ink concentrate.

Example 19A

An ultraviolet curable fluorescent ink was made by adding 8.0 grams of the fluorescent ink concentrate of Example 19 to 1.3 grams of Ebecryl 3608, a fatty acid modified epoxy acrylate and 1.0 gram of Darocure 1173 photoinitiator.

Example 20

A fluorescent photopolymerizable ink concentrate was synthesized by charging 37.5 g water, 40.4 g of formaldehyde, 104.8 g toluene sulfonamide and 0.45 grams of potassium tetraborate to a reactor. The reaction was heated to 85° C. upon which 27.6 grams of Solvent Yellow 85, 3.73 grams of Basic Red 1, 0.6 grams of Basic Violet 11 and 26 grams of melamine were added to the reactor. The reaction was then heated to 100° C. upon which 250 grams of trimethylol propane triacrylate, 0.24 grams of hydroquinone and 11.5 grams of talc were added to the reactor. The reaction was then heated to 110° C. upon which 40 grams of para-toluene sulfonyl isocyanate was added to the reactor. After the reaction stopped volatilizing gas, the product was passed over a three roll mill to provide a fluorescent photopolymerizable ink concentrate.

Evaluation of the Fluorescent Inks

The fluorescent ink concentrates and fluorescent inks of selected examples listed in Table I were brought to a final concentration of 8 parts color concentrate, 1 part Ebecryl 3608, a fatty acid modified epoxy acrylate, and 1 part Darocure 1173 photoinitiator. The fluorescent inks were printed on 100 #Centura Gloss Cover substrates using a "little Joe Color swatcher" offset applicator; a viscous homogeneous film about 0.6 mm thickness when wet, was formed on the substrate. The substrates were placed on a conveyor belt. The belt speed was 100 ft/minute. The printed substrates were then cured by exposing the fluorescent inks to ultraviolet light having a frequency range of about 250 to 400 nm, emitted from a mercury lamp from American UV, at 300 watts/inch. The exposure time was 1 second or less, typically about 0.20 seconds.

The fluorescent inks were evaluated by performing methyl ethyl ketone rub tests; a cured crock meter fitted with a cotton cloth saturated with methyl ethyl ketone was employed. The cotton cloth was wiped across the cured fluorescent inks with a pressure of about $2.37 \times 10^4$ pascals. The results are presented below in Table I.

TABLE I

SOLVENT RESISTANCE OF ULTRAVIOLET CURED FLUORESCENT INKS

| Sample | 1 MEK Rub | 5 MEK Rubs | 10 MEK Rubs |
| --- | --- | --- | --- |
| Example 6  | 5 | 4 | 3 |
| Example 8  | 5 | 3 | 2 |
| Example 9  | 5 | 4 | 2 |
| Example 10 | 5 | 3 | 2 |
| Example 11 | 5 | 4 | 3 |
| Example 13 | 4 | 3 | 3 |
| Example 14 | 5 | 4 | 4 |
| Example 16 | 4 | 3 | 2 |
| Example 17 | 4 | 3 | 2 |
| Example 18 | 4 | 3 | 2 |
| Example 19 | 3 | 2 | 2 |

1 - All color was removed from the substrate.
2 - Most of the color was removed from the substrate.
3 - Moderate amount of color was removed from the substrate.
4 - Slight amount of color was removed from the substrate.
5 - Minimal color was removed from the substrate.

Examples 1 to 4 required a second exposure to completely cure but the total exposure time was less than 1 second. Upon a second cure the results were similar to results shown above in Table I for Example 13. The remaining examples performed similarly to examples in Table I.

The ultraviolet/electron beam curable fluorescent inks of the examples have little or no color shift as determined visually when compared to uncured prints of the same fluorescent ink.

The fluorescent inks of Examples listed in Table II were printed on 100# Centura paper using a 1 meyer rod to draw down the fluorescent inks; a viscous homogeneous film was formed on the substrate. The printed substrates were then exposed to electron beam radiation using online gravure electron beam curing pilot line. The voltage was varied between 125 and 150 KeV, the dosage was varied between 2Mrad and the oxygen content was varied between 200–1000 ppm $O_2$. The fluorescent inks were evaluated by performing methyl ethyl ketone rub tests as described above. Similar evaluations were conducted using the solvents listed in Table III.

TABLE II

SOLVENT RESISTANCE OF ELECTRON BEAM CURED FLUORESCENT INKS

| | 1 MEK Rub | 5 MEK Rubs | 10 MEK Rubs | 15 MEK Rubs |
| --- | --- | --- | --- | --- |
| Conditions: 150 KeV, 2 Mrad, 1000 ppm $O_2$ | | | | |
| Example 13 | 5 | 4 | 4 | 3 |
| Example 16 | 5 | 4 | 4 | 3 |
| Example 17 | 5 | 5 | 5 | 4 |
| Conditions: 150 KeV, 1 Mrad, 200 ppm $O_2$ | | | | |
| Example 13 | 5 | 4 | 4 | 3 |
| Example 16 | 5 | 4 | 3 | 3 |
| Example 17 | 5 | 3 | 2 | 2 |
| Conditions: 125 KeV, 1 Mrad, 200 ppm $O_2$ | | | | |
| Example 13 | 5 | 4 | 4 | 3 |
| Example 16 | 5 | 4 | 3 | 3 |
| Example 17 | 5 | 3 | 2 | 2 |

1 = All color was removed from the substrate.
2 = Most of the color was removed from the substrate.
3 = Moderate amount of color was removed from the substrate.
4 = Slight amount of color was removed from the substrate.
5 = Minimal color was removed from the substrate.

TABLE III

SOLVENT RESISTANCE OF ELECTRON BEAM CURED INKS

| Solvent | Example 16 | Example 17 |
| --- | --- | --- |
| Conditions: 150 KeV, 2 Mrad, 1000 ppm $O_2$ | | |
| 25% Ammonia | 5 | 5 |
| 85% $H_3PO_3$ | 5 | 5 |
| Sec Butyl Alcohol | 4 | 5 |
| Cyclohexanone | 2 | 4 |
| Nonane | 5 | 5 |
| Isopropanol | 4 | 5 |
| Propyl Acetate | 1.5 | 1.5 |
| Chlorobenzene | 3 | 2 |
| Methanol | 5 | 5 |
| Dimethylformamide | 1 | 1 |

1 = All color was removed from the substrate.
2 = Most of the color was removed from the substrate.
3 = Moderate amount of color was removed from the substrate.
4 = Slight amount of color was removed from the substrate.
5 = Minimal color was removed from the substrate.

As shown in Tables II and III, the fluorescent inks display resistance to a variety of solvents particularly to methanol and methyl ethyl ketone.

Although certain embodiments of this invention have been shown and described, various adaptations and modifications can be made without departing from the scope of the invention as defined in the appended claims.

What is claimed is:

1. A fluorescent ink or ink concentrate comprising:
  a. from about 10 to 90% of an oligomer selected from the group of: a formaldehyde oligomer comprised of polymerized units of a formaldehyde monomer and an aromatic amide monomer;
  a cyclic-aliphatic oligomer comprised of from about 30% to about 70%, by weight, of the cycloaliphatic monomer weight, of polymerized units of an aliphatic monomer and from about 30% to about 70%, by weight, of the cycloaliphatic monomer weight, of aromatic or non-aromatic cyclic monomers; and a mixture thereof; wherein the aliphatic monomer has from 2 to 80 carbon atoms;

wherein the cyclic-aliphatic oligomer is a polyester-amide, polyurethane, polyurea, or polyurethane-urea;

b. from about 10 to 80% of photopolymerizable vehicle comprised of: an acrylated or methacrylated photopolymerizable monomer; or acrylated or methacrylated photopolymerizable oligomers; or both;

c. from about 0.1% to 15% fluorescent dye, and, d. from about 0 to about 20% photoinitiator.

2. The ink or ink concentrate of claim 1 wherein the oligomer is present from about 20 to 70%, and the photopolymerizable vehicle is present from about 30 to 80%; and further wherein the oligomer is the formaldehyde oligomer which is comprised of polymerized units of formaldehyde monomer and an aromatic amide monomer, wherein the amide monomer is selected from the group consisting of: toluene sulfonamide; benzamide; benzenesulfonamide; and alkyl derivatives thereof.

3. The ink or ink concentrate of claim 1 wherein the photo polymerizable vehicle comprises at least one acrylated monomer or at least one acrylated oligomer.

4. The ink or ink concentrate of claim 1, further comprising from about 1% to 20% photoinitiator.

5. The fluorescent ink or ink concentrate of claim 1, wherein the aliphatic monomer is selected from the group consisting of: cetyl alcohol, 1,6-hexanediol, 1,6-hexanediamine, azealaic acid, lauryl alcohol, myristryl alcohol, docosyl alcohol, oleyl alcohol, cetyl alcohol, stearyl alcohol, oleic acid, linoleic acid, maleic acid maleic anhydride, succinic acid, methacrylic acid, ethylene, diamine, ethylene glycol, stearic acid, aliphatic acid esters and their acid chloride derivatives, butanol, pentaerythritol, polyethleneglycol, hydroxy ethyl methacrylate, dipentaerythritol pentaacrylate and polytetramethylene oxide.

6. The ink or ink concentrate of claim 1, wherein the oligomer is the formaldehyde oligomer, which has a weight average molecular weight from about 400 to 5000 g/mole, said ink further comprising a crosslinking monomer, wherein the ratio of the formaldehyde monomer to the aromatic amide monomer to the crosslinking monomer is from about 100:200:1 to 5:3:2.

7. The ink or ink concentrate of claim 6, further comprising polymerized units of a crosslinker monomer having from 1 to 28 carbon atoms and at least two amino groups.

8. The ink or ink concentrate of claim 6, wherein the aromatic amide monomer comprises: at least one amide group; at least one amide hydrogen; and from about 6 to 12 carbon atoms; wherein the ratio of the formaldehyde monomer to the aromatic amide monomer to the crosslinking monomer is about 13:6:2.

9. The ink or ink concentrate of claim 7 wherein the oligomer is present from about 30 to 60%, and the photopolymerizable vehicle is present from about 35 to 65%, further wherein the crosslinking monomer is selected from the group consisting essentially of: melamine; urea; ethylene diamine; hexamethylene diamine; 2-methylpentamethylenediamine; benzogaunamine; p,p'diaminodiphenylmethane; 3,5-diaminobenzoic acid; quanidine; 2,4-diamino-b-hydroxypyrimidone; aminoguanidine; and isophorone diamine.

10. The ink or ink concentrate of claim 6, wherein the ratio of the formaldehyde monomer to the aromatic amide monomer is from about 1:1 to 1:2.

11. The ink or ink concentrate of claim 9 wherein the photo polymerizable vehicle comprises at least one acrylated monomer or at least one acrylated oligomer.

12. The ink or ink concentrate of claim 9 wherein the oligomer comprises polymerized units of formaldehyde, toluene sulfonamide and a crosslinking monomer which is selected form the group consisting of: melamine, urea, and benzoguanamine.

13. The ink or ink concentrate of claim 12 wherein the ratio of formaldehyde to toluene sulfonamide to melamine is from 5:3:2 to 10:3:2.

14. The ink of claim 6, wherein ink comprises from about 30 to 45% of the formaldehyde oligomer which comprises: from about 20 to 28% of formaldehyde; from about 48 to 70% of the aromatic amide toluene sulfonamide, and from about 10 to 24% of melamine crosslinking monomer; and the ink comprises from about 5 to 7% dye, and from about 45 to 60% of the photo-polymerizable vehicle, wherein the photo-polymerizable vehicle is comprised of tripropyleneglycol diacrylate and trimethylolpropane ethoxylated triacrylate.

15. The ink or ink concentrate of claim 1 wherein the oligomer is
from about 20 to 90% cyclic-aliphatic oligomer, which has a weight average molecular weight of from about 1,000 to 50,000 g/mole, is comprised of polymerized units of: from about 40 to 55% of a cyclic monomer; and from about 45 to 60% of an aliphatic monomer.

16. The ink or ink concentrate of claim 15 wherein the oligomer is present from about 30 to 60%, and the photopolymerizable vehicle is present from about 35 to 65% and further wherein the cyclic monomer is selected from the group consisting of: p,p-diaminodiphenylmethane; cyclohexane dimethanol; phthalic anhydride; isophorone diamine; bisphenol A; benzoic acid; chlorendenic anhydride; trimellitic anhydride; pyromellitic anhydride; and tris (2-hydroxyethyl) isocyanurate.

17. The ink or ink concentrate of claim 15 wherein the oligomer contains from about 30% to 70% cyclic monomers which have from 5 to 15 carbons, from 30% to 70% aliphatic monomers, which have from about 2 to 80 carbons, and the oligomer further comprises at least one polar group.

18. The ink or ink concentrate of claim 15, wherein the oligomer contains from about 40 to 55% cyclic monomers which have from 5 to 15 carbons, and from about 45 to 60% aliphatic monomers which have from about 4 to 40 carbon atoms and at least one functional group selected from the group consisting of amine, alcohol, carboxylic acid or mixtures thereof.

19. The ink or ink concentrate of claim 16 wherein the photo polymerizable vehicle comprises at least one acrylated monomer or at least one acrylated oligomer.

20. The fluorescent ink or ink concentrate of claim 16, wherein the aliphatic monomers are selected from the group consisting of: cetyl alcohol, 1,6-hexanediol, 1,6-hexanediamine, azealaic acid, lauryl alcohol, myristryl alcohol, docosyl alcohol, oleyl alcohol, cetyl alcohol, stearyl alcohol, oleic acid, linoleic acid, maleic acid maleic anhydride, succinic acid, methacrylic acid, ethylene, diamine, ethylene glycol, stearic acid, aliphatic acid esters and their acid chloride derivatives, butanol, pentaerythritol, polyethleneglycol, hydroxy ethyl methacrylate, dipentaerythritol pentaacrylate and polytetramethylene oxide.

21. The ink or ink concentrate of claim 15, wherein the monomers comprise succinic acid, diaminopentane and cyclohexanedimethanol.

22. A fluorescent ink or ink concentrate comprising:
a. from about 10 to 90% of a polyester cyclic-aliphatic oligomer comprised of polymerized units of a unsaturated aliphatic monomer and aromatic or non-aromatic cyclic monomers; wherein the aliphatic monomer has from 2 to 80 carbon atoms;

b. from about 10 to 80% of photopolymerizable vehicle comprised of: an acrylated or methacrylated photopolymerizable monomer; or acrylated or methacrylated photopolymerizable oligomers; or both;

c. from about 0.1% to 15% fluorescent dye, and, d. from about 0 to about 20% photoinitiator.

23. The fluorescent ink or ink concentrate of claim 22, wherein the cyclic-aliphatic oligomer comprises polymerized units of: chlorendic anyhdride and hydroxyethyl methacrylate.

24. The fluorescent ink or ink concentrate of claim 22, wherein the cyclic-aliphatic oligomer comprises polymerized units of: dipentaerythritol pentaacrylate and chlorendic anhydride.

25. The ink or ink concentrate of claim 22, wherein the cyclic monomers are selected from the group consisting of: cyclohexane dimethanol, phthalic anhydride, bisphenol A, benzoic acid, chlorendenic anhydride; pyromellitic anhydride; tris (2-hydroxyethyl) isocyanurate; and trimellitic anhydride, and, the aliphatic monomers are selected from the group consisting of: docosyl alcohol, oleyl alcohol, oleic acid, linoleic acid, maleic acid, maleic anhydride, methacrylic acid, stearic acid, aliphatic acid esters and their acid chloride derivatives, and hydroxy ethyl methacrylate, and dipentaerythritol pentaacrylate.

26. A method of printing with fluorescent ink comprising the following steps:

a. providing a fluorescent ink comprising:

from about 10 to 90% of an oligomer selected from the group consisting of:

formaldehyde oligomer comprised of polymerized units of a formaldehyde monomer and an aromatic amide monomer;

cyclic-aliphatic oligomer comprised of polymerized units of from about 30% to about 70%, by weight, of the cycloaliphatic monomer weight, aromatic or non-aromatic cyclic monomers, and from about 30% to about 70%, by weight, of the cycloaliphatic monomer weight, of polymerized units of aliphatic monomers;

and a mixture thereof;

wherein the cyclic-aliphatic oligomer is a polyesteramide, polyurethane, polyurea, or polyurethaneurea;

from about 10 to 80% of photopolymerizable vehicle comprised of: an acrylated or methacrylated photopolymerizable monomer; or acrylated or methacrylated photopolymerizable oligomers; or both;

from about 0.1% to 15% fluorescent dye, and, from about 0 to about 20% photoinitiator;

b. applying the ink to a substrate;

c. exposing the ink to ultraviolet radiation or an electron beam to obtain a cured fluorescent ink.

27. A method of printing with fluorescent ink comprising the following steps:

a. providing a fluorescent ink comprising:

a. from about 10 to 90% of a polyester cyclic-aliphatic oligomer comprised of polymerized units of an unsaturated aliphatic monomer and aromatic or non-aromatic cyclic monomers;

wherein the aliphatic monomer has from 2 to 80 carbon atoms;

b. from about 10 to 80% of photopolymerizable vehicle comprised of: an acrylated or methacrylated photopolymerizable monomer; or acrylated or methacrylated photopolymerizable oligomers; or both;

c. from about 0.1% to 15% fluorescent dye, and, d. from about 0 to about 20% photoinitiator;

b. applying the ink to a substrate;

c. exposing the ink to ultraviolet radiation or an electron beam to obtain a cured fluorescent ink.

* * * * *